US010444355B2

United States Patent
Pala et al.

(10) Patent No.: US 10,444,355 B2
(45) Date of Patent: Oct. 15, 2019

(54) OPTICAL MODULATING DEVICE AND SYSTEM EMPLOYING SAME

(71) Applicants: SAMSUNG ELECTRONICS CO., LTD., Suwon-si (KR); CALIFORNIA INSTITUTE OF TECHNOLOGY, Pasadena, CA (US)

(72) Inventors: Ragip Pala, Pasadena, CA (US); Harry Atwater, Pasadena, CA (US); Muhammad Alam, Pasadena, CA (US); Duhyun Lee, Yongin-si (KR); Byunghoon Na, Suwon-si (KR); Seunghoon Han, Seoul (KR)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/866,998

(22) Filed: Jan. 10, 2018

(65) Prior Publication Data
US 2018/0196137 A1      Jul. 12, 2018

Related U.S. Application Data

(60) Provisional application No. 62/444,496, filed on Jan. 10, 2017.

(30) Foreign Application Priority Data

Nov. 13, 2017 (KR) .......................... 10-2017-0150711

(51) Int. Cl.
G01S 17/02 (2006.01)
G02F 1/017 (2006.01)
(Continued)

(52) U.S. Cl.
CPC .............. *G01S 17/02* (2013.01); *G01S 7/481* (2013.01); *G01S 7/4817* (2013.01);
(Continued)

(58) Field of Classification Search
CPC ........ G01S 17/02; G01S 7/4817; G01S 7/481; G02F 1/292; G02F 1/21; G02F 1/01716;
(Continued)

(56) References Cited

U.S. PATENT DOCUMENTS 6,738,105 B1 * 5/2004 Hannah ................ H04N 5/7416
                                                                   348/745
8,804,226 B2      8/2014 Lee et al.
(Continued)

*Primary Examiner* — Tuyen Tra
(74) *Attorney, Agent, or Firm* — Sughrue Mion, PLLC

(57) ABSTRACT

Provided are an optical modulating device and a system employing the same. The optical modulating device includes a phase modulator including a meta surface including a nanoantenna configured to couple light incident on the phase modulator, and including a quantum well layer having a multi-quantum well and configured to modulate a phase of light by modulating a refractive index according to an electrical control, and a reflective layer provided at on the phase modulator opposite to a side of the meta surface of the phase modulator and configured to resonate light coupled through the nanoantenna.

18 Claims, 11 Drawing Sheets

(51) Int. Cl.
  *G01S 7/481* (2006.01)
  *G02F 1/21* (2006.01)
  *G02F 1/29* (2006.01)
  *G02F 1/015* (2006.01)

(52) U.S. Cl.
  CPC ............ *G02F 1/01716* (2013.01); *G02F 1/21* (2013.01); *G02F 1/292* (2013.01); *G02F 2001/0151* (2013.01); *G02F 2202/30* (2013.01); *G02F 2203/15* (2013.01); *G02F 2203/50* (2013.01)

(58) Field of Classification Search
  CPC ............ G02F 2203/50; G02F 2203/15; G02F 2202/30; G02F 2001/0151
  USPC .................... 359/237, 238, 240, 245, 279
  See application file for complete search history.

(56) References Cited

U.S. PATENT DOCUMENTS

| | | |
|---|---|---|
| 9,306,672 B2 | 4/2016 | Blauvelt et al. |
| 9,711,697 B2 * | 7/2017 | Vassant .................... G02F 1/00 |
| 2016/0223723 A1 | 8/2016 | Han et al. |
| 2016/0320642 A1 | 11/2016 | Park et al. |

* cited by examiner

OPTICAL MODULATING DEVICE AND SYSTEM EMPLOYING SAME

CROSS-REFERENCE TO RELATED APPLICATIONS

This application claims the priority from U.S. Provisional Application No. 62/444,496, filed on Jan. 10, 2017, in the United States Patent and Trademark Office and Korean Patent Application No. 10-2017-0150711, filed on Nov. 13, 2017, in the Korean Intellectual Property Office, the disclosures of which are incorporated herein in their entireties by reference.

BACKGROUND

1. Field

Example embodiments of the present disclosure relate to an optical modulating device and a system employing the same, and more particularly, to an optical modulating device having a meta structure and a system employing the same.

2. Description of the Related Art

Optical devices configured to change the transmission/reflection, polarization, phase, intensity, path, and the like of incident light are used in various optical apparatuses. In addition, various structures of optical modulating devices are provided to control the properties of light in a desired way within an optical system.

For example, a liquid crystal having optical anisotropy, a microelectromechanical system (MEMS) structure using a micromechanical motion of a light blocking/reflection element, and the like are widely used in general optical modulating devices. These optical modulating devices have a slow operation response time of several micro seconds or more in the characteristic of a driving method thereof.

Recently, a meta structure has been applied to an optical modulating device. The meta structure is a structure in which a dimension smaller than a wavelength of incident light is applied to a thickness, a pattern, a period, or the like of the meta structure.

SUMMARY

One or more example embodiments provide an optical modulating device employing a meta structure to enable light to be modulated at a higher speed and have a higher optical efficiency, and a system employing the same.

According to an aspect of an example embodiment, there is provided an optical modulating device including a phase modulator including a meta surface including a nanoantenna configured to couple light incident on the phase modulator, and a quantum well layer including a multi-quantum well configured to modulate a phase of the light incident by modulating a refractive index of the quantum well layer by an electrical control, and a reflective layer provided on the phase modulator opposite to a side of the meta surface of the phase modulator and configured to resonate the light coupled by the nanoantenna.

The phase modulator may further include a dielectric nanoantenna provided on the quantum well layer and forming the nanoantenna, wherein the dielectric nanoantenna is formed by patterning a dielectric layer in a nanostructure to form the meta surface comprising the nanoantenna.

The phase modulator may further include a lower electrode and an upper electrode provided on a lower part and an upper part, opposite to the lower part, of the quantum well layer, respectively, and configured to modulate a refractive index of the quantum well layer by electrically controlling the quantum well layer.

The phase modulator may be provided on the reflective layer, the lower electrode may be provided on the reflective layer, the quantum well layer may be provided on the lower electrode, the upper electrode may be provided on the quantum well layer, and a plurality of dielectric nanoantennas may be provided on the upper electrode.

The plurality of quantum well layer regions including the quantum well layer may be provided on the lower electrode spaced apart from each other, the upper electrode may be provided on each quantum well layer region, and the plurality of dielectric nanoantennas may be arranged on each upper electrode formed on each quantum well layer region, wherein the phase modulator may include an array of a plurality of phase modulators, and may be configured to independently control each of the plurality of phase modulators.

The lower electrode may be a common electrode.

The plurality of phase modulators may be arranged two-dimensionally to form a two-dimensional optical modulating device.

The plurality of phase modulators may be arranged one-dimensionally to form a one-dimensional optical modulating device.

The reflective layer may include a distributed Bragg reflector.

The nanoantenna of the phase modulator may be formed by patterning the quantum well layer in a nanostructure, wherein the quantum well layer may include a plurality of quantum well layer regions, and wherein each of the plurality of quantum well layer regions forming the nanoantenna may be spaced apart from one another.

The optical modulating device may further include a spacer layer between the quantum well layer and the reflective layer.

The spacer layer may be formed of a dielectric material.

The optical modulating device may further include a lower electrode and an upper electrode on a lower part and an upper part, opposite from the lower part, of each of the plurality of quantum well layer regions, respectively, and may be configured to modulate a refractive index by electrically controlling the quantum well layer.

The reflective layer may be a common electrode.

The phase modulator may include an array of a plurality of phase modulators, each of the plurality of phase modulators comprising each of the plurality of quantum well layer regions, and the lower electrode and the upper electrode corresponding to each of the plurality of quantum well layer regions.

The phase modulators in the array of the plurality of phase modulators may be configured to be independently controlled.

The array of the plurality of phase modulators may be arranged two-dimensionally to form a two-dimensional optical modulating device.

The array of the plurality of phase modulators may be arranged one-dimensionally to form a one-dimensional optical modulating device.

The quantum well layer may be configured to form a multi-quantum well by using a Group III-V semiconductor.

According to an aspect of another example embodiment, there is provided a light detecting and ranging (LIDAR)

apparatus including a light source configured to emit light, the optical modulating device configured to steer light emitted from the light source toward an object, and a sensor configured to receive light steered by the optical modulating device toward the object and reflected from the object.

BRIEF DESCRIPTION OF THE DRAWINGS

The above and/or other aspects will become apparent and more readily appreciated from the following description of the example embodiments, taken in conjunction with the accompanying drawings in which.

DETAILED DESCRIPTION

Figure 1:
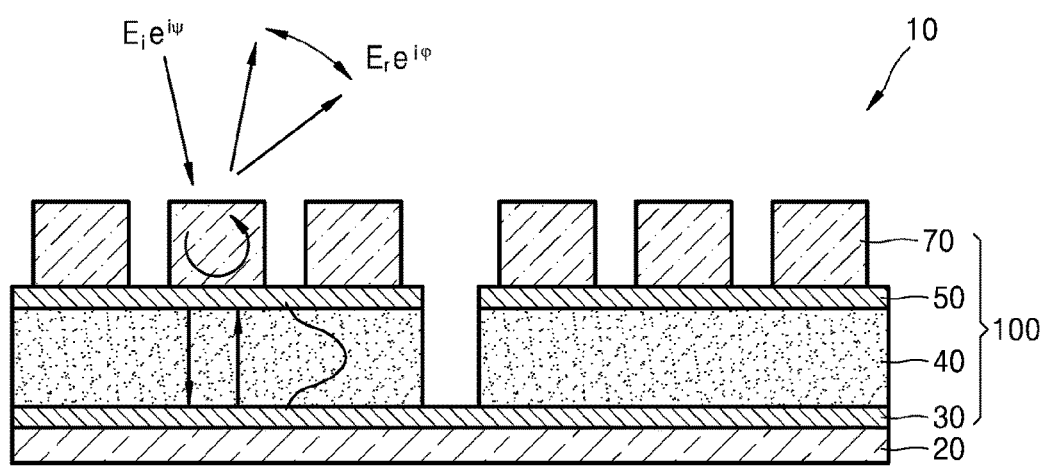
FIG. 1 schematically shows an example structure of an optical modulating device according to an example embodiment.

Hereinafter, an optical modulating device and a system employing the same are described in detail with reference to the accompanying drawings. In the drawings, like reference numerals denote like elements, and the sizes or thicknesses of components may be exaggerated for convenience of description. The example embodiments described below are only illustrative, and various changes in form and details may be made therein.

Throughout the specification, it will be understood that when a part "includes" or "comprises" an element, unless otherwise defined, the part may further include other elements, not excluding the other elements. It will be further understood that the singular forms "a," "an," and "the" include plural referents unless the context clearly dictates otherwise.

As used herein, the term "and/or" includes any and all combinations of one or more of the associated listed items. Expressions such as "at least one of" or "at least one from among" when preceding a list of elements, modify the entire list of elements and do not modify the individual elements of the list. For example, the expression, "at least one from among a, b, and c," should be understood as including only a, only b, only c, both a and b, both a and c, both b and c, or all of a, b, and c.

It will be understood that when it is described that one layer is "on", "on an upper part of", or "above" a substrate or another layer, the layer may be located on the substrate or another layer directly or via another layer in the middle. It will be also understood that, although the terms "first", "second", etc. may be used herein to describe various elements, the elements should not be limited by these terms. These terms are only used to distinguish one element from another element.

An optical modulating device according to an example embodiment may include a phase modulator including a meta surface having a nanoantenna configured to couple incident light, and a quantum well layer having a multi-quantum well, and may be provided to modulate a phase of the incident light by modulating a refractive index using the electro-optic effect of the multi-quantum well. In addition, the optical modulating device according to an example embodiment may include a reflective layer provided at an opposite side of the meta surface of the phase modulator, to phase-modulate, reflect, and output the light incident by being coupled through the nanoantenna. The optical modulating device may operate as a reflective meta device.

In the optical modulating device according to an example embodiment, the quantum well layer may be formed of a semiconductor material. When electro-optic modulation of a multi-quantum well made of a semiconductor material is used, phase modulation, for example, up to about 2 pi, may be obtained by a change in a refractive index.

The optical modulating device according to an example embodiment may be applied to various fields such as the laser beam steering field, the light detecting and ranging (LIDAR) field, the spatial light modulator (SLM) field, the micro-display field, the holography field, the active optical element field, and the high-order diffraction field.

FIG. 1 schematically shows an example structure of an optical modulating device 10 according to an example embodiment.

Referring to FIG. 1, the optical modulating device 10 may be a reflective meta device and may include a phase modulator 100 including a quantum well layer 40 and a meta surface including a nanoantenna, and a reflective layer 20 provided on the phase modulator opposite to the side of the meta surface of the phase modulator 100. For example, the optical modulating device 10 may have a structure having the reflective layer 20 and the phase modulator 100, including the meta surface having the nanoantenna and the quantum well layer 40, provided on the reflective layer 20.

The meta surface may have a sub-wavelength artificial structure and may include a nanoantenna. According to an example embodiment, the optical modulating device 10 may include a variable meta material based on nano-structured multiple layers of an electro-optic semiconductor material to enable a nanoantenna characteristic to be dynamically controlled.

The phase modulator 100 may have a meta surface including a nanoantenna configured to couple incident light on the optical modulating device and may be provided to modulate a phase of the incident light by modulating a refractive index of the quantum well layer 40 according to an electrical control of the quantum well layer 40 made of a semiconductor material. The nanoantenna may operate as a resonator having a resonant frequency set by dimensions and a dielectric constant of an environment. An applied bias may change a refractive index of an active layer, i.e., the quantum well layer 40, and modulate the resonant frequency, thereby modulating a phase of light.

In the phase modulator 100, the quantum well layer 40 may include a multi-quantum well (MQW) to module a refractive index using the electric-optic effect of the MQW, and to modulate a phase of light resonated accordingly.

The phase modulator 100 may include, for example, the quantum well layer 40 including the MQW to modulate a phase of light by modulating a refractive index according to an electrical control, and a dielectric nanoantenna 70 located on the quantum well layer 40, as shown in FIG. 1. In this case, the dielectric nanoantenna 70 may be formed by forming a dielectric material layer and patterning the dielectric material layer in a nanostructure to form a meta surface including a nanoantenna.

In the optical modulating device 10 according to an example embodiment, the dielectric nanoantenna 70 may exhibit a higher antenna efficiency by using Mie resonance by a displacement current. To this end, the dielectric nanoantenna 70 may be made of a material of which a dielectric constant is, for example, 10 or more. That is, the dielectric nanoantenna 70 may be provided to have a shape defined by a dimension of a sub-wavelength order and have a higher permittivity. The dielectric nanoantenna 70 may have, for example, a higher permittivity than a permittivity of the quantum well layer 40 functioning as an active layer.

Herein, a sub-wavelength indicates a smaller dimension than a wavelength of light to be modulated by the phase modulator 100. At least one of the dimensions defining a shape of the dielectric nanoantenna 70 may be in a dimension of the sub-wavelength. For example, when a wavelength of light to be modulated by the phase modulator 100 is $\lambda$, the sub-wavelength may have a dimension equal to or less than $\lambda/2$.

In addition, the dielectric nanoantenna 70 may have a refractive index higher than a refractive index of the quantum well layer 40. The dielectric nanoantenna 70 may have a refractive index higher than the highest refractive index of the quantum well layer 40 within a range in which the refractive index of the quantum well layer 40 changes according to an electrical signal. The higher refractive index of the nanoantenna 70 may be obtained when a dielectric constant of the dielectric nanoantenna 70 is, for example, 10 or more.

The quantum well layer 40 may be configured to modulate the refractive index of the quantum well layer 40 by using the electro-optic effect of the MQW, and may be formed of a semiconductor material. The quantum well layer 40 may have a pin structure and may be formed using, for example, a Group III-V semiconductor. The quantum well layer 40 may have a structure in which the MQW is formed on a gallium arsenide phosphide (GaAsP) barrier by using gallium arsenide (GaAs) and indium gallium arsenide (InGaAs).

In the optical modulating device 10 according to an example embodiment, the phase modulator 100 may include a lower electrode 30 and an upper electrode 50 respectively provided on a lower part and an upper part of the quantum well layer 40 to modulate a refractive index of the quantum well layer 40 by electrically controlling the quantum well layer 40.

In this case, the phase modulator 100 may be formed on the reflective layer 20 such that the lower electrode 30 may be formed on the reflective layer 20, the quantum well layer 40 may be formed on the lower electrode 30, the upper electrode 50 may be formed on the quantum well layer 40 opposite to the lower electrode 30, and a plurality of dielectric nanoantennas 70 may be arranged on the upper electrode 50 on the quantum well layer 40. A refractive index of the MQW of the quantum well layer 40 may be modulated by applying a voltage to the upper electrode 50 and the lower electrode 30.

Figure 2A:
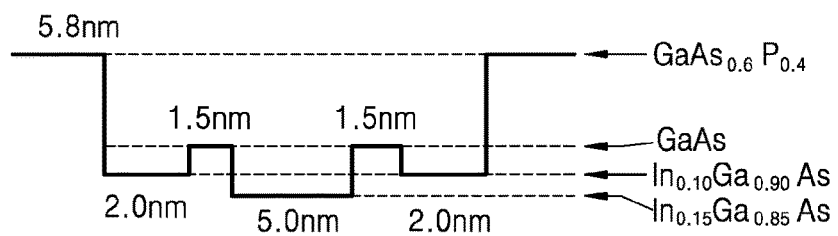
FIG. 2A schematically shows a quantum well layer, according to an example embodiment.
Figure 2B:
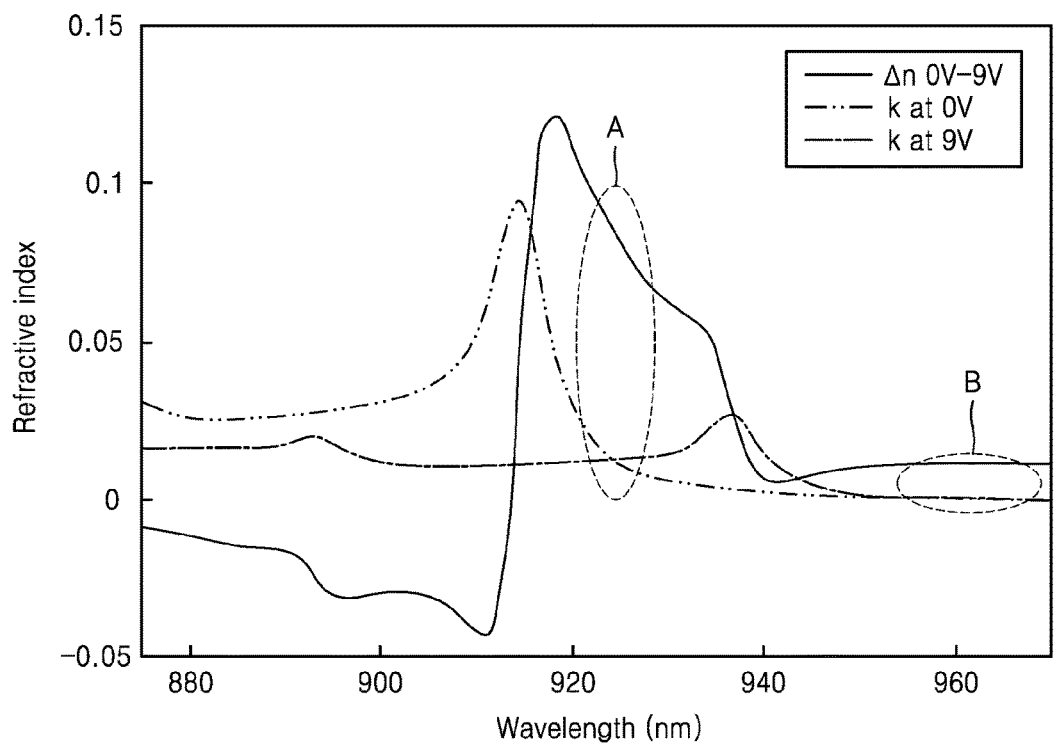
FIG. 2B is a graph showing a change in refractive index according to a wavelength when voltages of about 0 V and about 9 V are applied to the quantum well layer of FIG. 2A.

FIG. 2A schematically shows the quantum well layer 40 according to an example embodiment, and illustratively shows a thickness of each layer forming the quantum well layer 40, a semiconductor material combination and composition of each layer, and a barrier height. FIG. 2B is a graph showing a refractive index change according to a wavelength when voltages of about 0 V and about 9 V are applied to the quantum well layer 40 of FIG. 2A.

As shown in FIG. 2A, when the quantum well layer 40 is formed such that an MQW is formed on a GaAsP barrier by using GaAs and InGaAs, as shown in FIG. 2B, when voltages of about 0 V and about 9 V are applied, an absorption rate may be lower and a refractive index change may be larger in a certain wavelength, thereby enabling phase modulation at a higher efficiency. In wavelength bands of regions denoted by "A" and "B" in FIG. 2B, when voltages of 0 V and 9 V are applied, an absorption rate is lower and a refractive index change ($\Delta n$) is larger. Herein, wavelength bands in which an absorption rate is lower and a refractive index change is larger are not limited to the example of FIG. 2B, and wavelength bands in which an absorption rate is lower and a refractive index change is larger may vary according to a semiconductor material combination and composition of each layer forming the quantum well layer 40, and a barrier height.

Figure 3A:
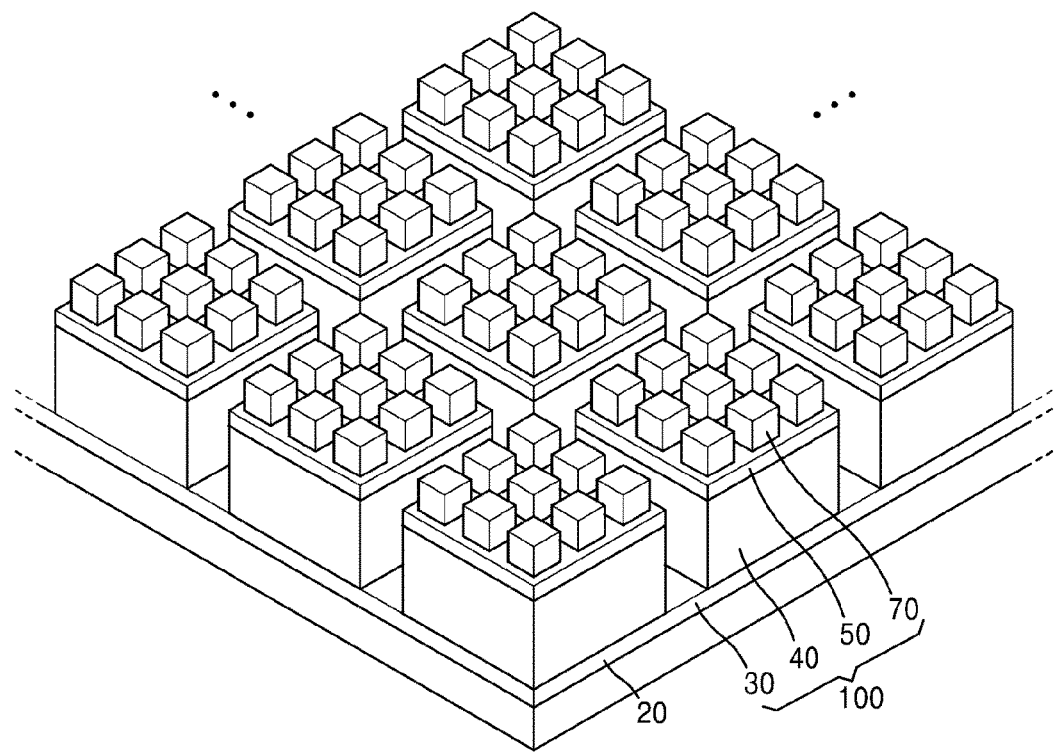
FIG. 3A shows an example in which the optical modulating device of FIG. 1 is implemented as a two-dimensional optical modulating device.
Figure 3B:
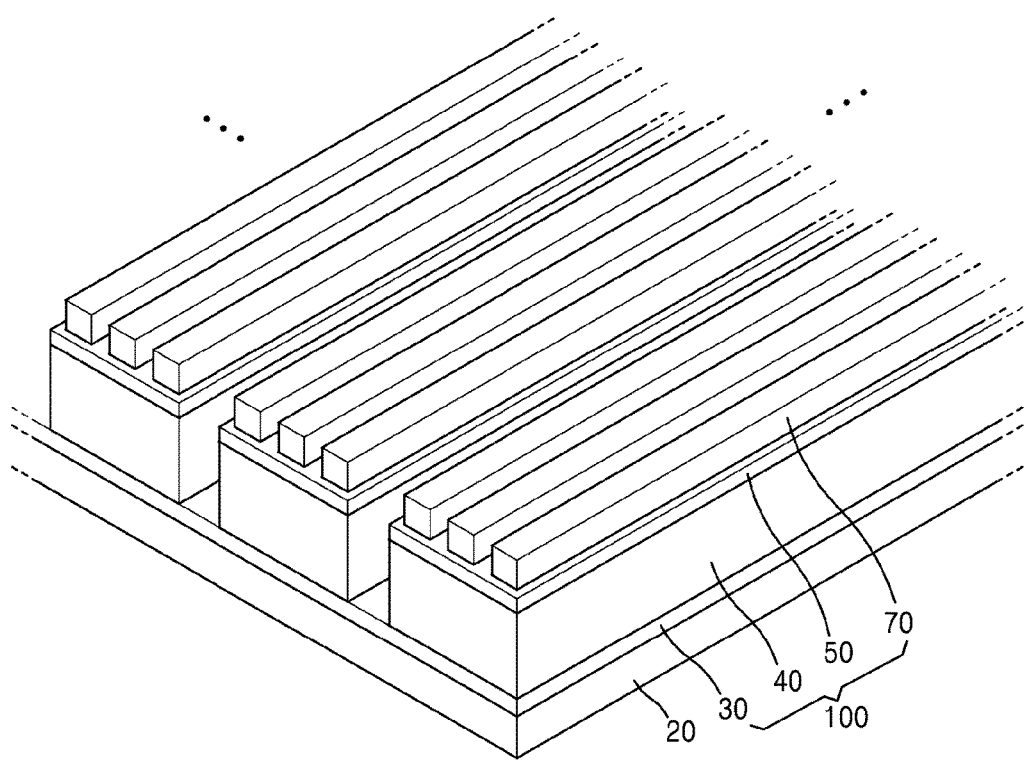
FIG. 3B shows an example in which the optical modulating device of FIG. 1 is implemented as a one-dimensional optical modulating device.

According to example embodiments, an array of a plurality of phase modulators 100 may be provided as illustratively shown in FIGS. 3A and 3B. That is, in the optical modulating device 10 according to an example embodiment, the array of the plurality of phase modulators 100 may be formed by forming the quantum well layer 40 such that an array of a plurality of quantum well layer regions spaced apart from each other is formed. In this case, the array of the plurality of phase modulators 100 may be formed by placing the plurality of quantum well layer regions on the lower electrode 30 to be spaced apart from each other, forming the upper electrode 50 on each quantum well layer region, and arranging a plurality of dielectric nanoantennas 70 on each of upper electrode 50 formed on each quantum well layer region, and each of the plurality of phase modulators 100 may be independently controlled. In this case, the lower electrode 30 may be formed as a common electrode or formed to correspond to each phase modulator 100, and the upper electrode 50 may be formed to correspond to each phase modulator 100.

The plurality of phase modulators 100 may be arranged two-dimensionally as shown in FIG. 3A to form a two-dimensional optical modulating device capable of two-dimensionally modulating a phase. Herein, each phase modulator 100 may be provided to form a two-dimensional array in units of pixels such that a beam may be two-dimensionally steered by phase modulation of each phase modulator 100. In this case, dielectric nanoantennas 70 arranged on each phase modulator 100 may be formed in a two-dimensional arrangement. The upper electrode 50 may be formed to correspond one-to-one to each phase modulator 100 in correspondence to an arrangement of the phase modulators 100, and the lower electrode 30 may be formed as a common electrode or formed to correspond to the arrangement of the phase modulators 100. In this case, an incident beam may be two-dimensionally steered by using the two-dimensional optical modulating device.

According to another example embodiment, the plurality of phase modulators 100 may be arranged one-dimensionally as shown in FIG. 3B to form a one-dimensional optical modulating device capable of one-dimensionally modulating a phase. Herein, each phase modulator 100 may be provided in a linear shape to form a one-dimensional array such that a beam may be one-dimensionally steered by phase modulation of each phase modulator 100. The upper electrode 50 may be formed to correspond one-to-one to each phase modulator 100 in correspondence to an arrangement of the phase modulators 100, and the lower electrode 30 may be formed as a common electrode or formed to correspond to the arrangement of the phase modulators 100. Dielectric nanoantennas 70 may be arranged in a linear shape. However, example embodiment are not limited thereto, and the dielectric nanoantennas 70 with a linear shape may be arranged in a two-dimensional arrangement as illustrated in FIG. 3A. As illustrated in FIG. 3B, an incident beam may be one-dimensionally steered by using the one-dimensional optical modulating device obtained by one-dimensionally arranging the plurality of phase modulators 100.

In the optical modulating device 10 according to an example embodiment, the reflective layer 20 may be provided at an opposite surface of the phase modulator 100 from the meta surface of the phase modulator 100, i.e., at a lower part of the optical modulating device 10, to function as a reflective plate. The reflective layer 20 may include a distributed Bragg reflector (DBR) to increase reflectance. The reflective layer 20 may be formed using a general reflector.

As described above, the optical modulating device 10 according to an example embodiment may have a structure in which the reflective layer 20, e.g., a DBR, is located at a lower part, the quantum well layer 40, for example, of a pin structure, having an MQW is formed on the reflective layer 20, and dielectric nanoantennas 70 are formed on the quantum well layer 40.

According to this example optical modulating device 10, the dielectric nanoantenna 70 may be configured to couple incident light on the optical modulating device 10, and a refractive index of the quantum well layer 40 through which light passes in a resonance operation with the reflective layer 20, i.e., a DBR, located at a lower part, may be modulated, such that a phase of resonated light may be modulated. Herein, the refractive index of the quantum well layer 40 may be modulated by a voltage applied through the upper electrode 50 and the lower electrode 30, and a phase of light may be modulated according to this refractive index modulation.

In addition, in the optical modulating device 10 according to an example embodiment, the phase modulator 100 may be formed in a stack structure of the quantum well layer 40 and the dielectric nanoantenna 70. The phase modulator 100 may form a cavity-integrated guided-mode resonator, and each cavity may provide a closely arranged combination of Mie resonance and guided-mode resonance such that a larger phase shift controlled by a bias at a wider spectral operation bandwidth is possible. In addition, a DBR may be applied as the reflective layer 20 located at a lower part of the phase modulator 100, and thus the DBR and the phase modulator 100 may be monolithically integrated on a III-V group wafer.

Figure 4:
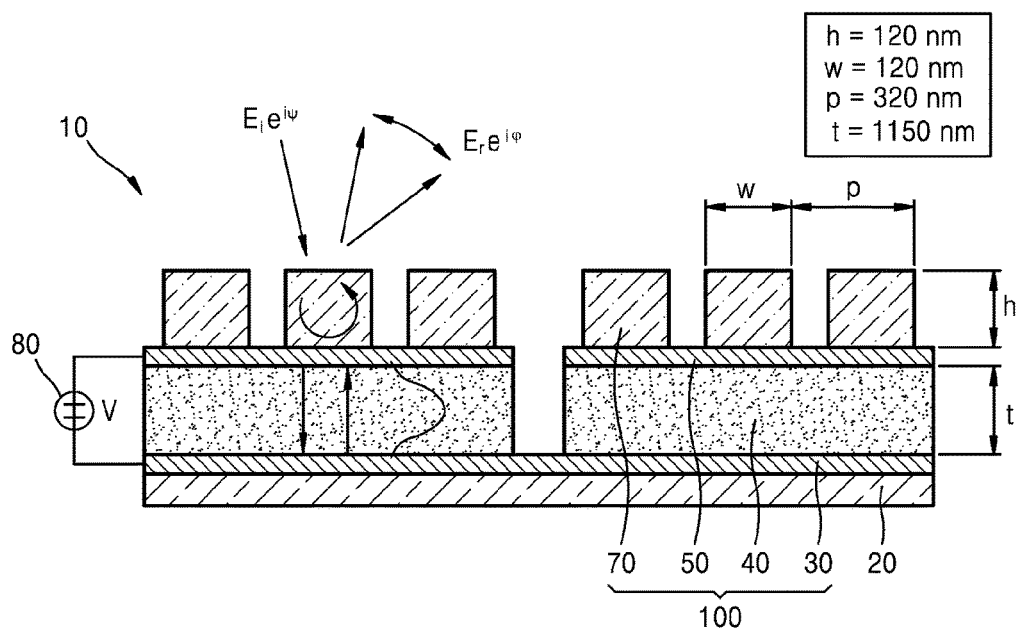
FIG. 4 illustrates an example in which the optical modulating device of FIG. 1 operates as a guided-mode resonator to modulate a phase of incident light according to an example embodiment.

FIG. 4 illustrates an example in which the optical modulating device 10 of FIG. 1 operates as a guided-mode resonator to modulate a phase of incident light.

Referring to FIG. 4, when light is incident to the dielectric nanoantenna 70 of the optical modulating device 10, incident light $E_i e^{i\psi}$ is coupled by the dielectric nanoantenna 70 and travels through the quantum well layer 40, an optical mode is guided in the quantum well layer 40 in a resonance operation with the reflective layer 20 e.g., a DBR, located at a lower part, and a phase of resonated light may be modulated by modulating a refractive index of an MQW of the quantum well layer 40 through which light passes. In this case, to modulate of the refractive index of the MQW, a voltage is applied from a driver 80 to the upper electrode 50 and lower electrode 30. Accordingly, phase-modulated reflected light $E_r e^{i\Phi}$ may be output from the optical modulating device 10.

Figure 5A:
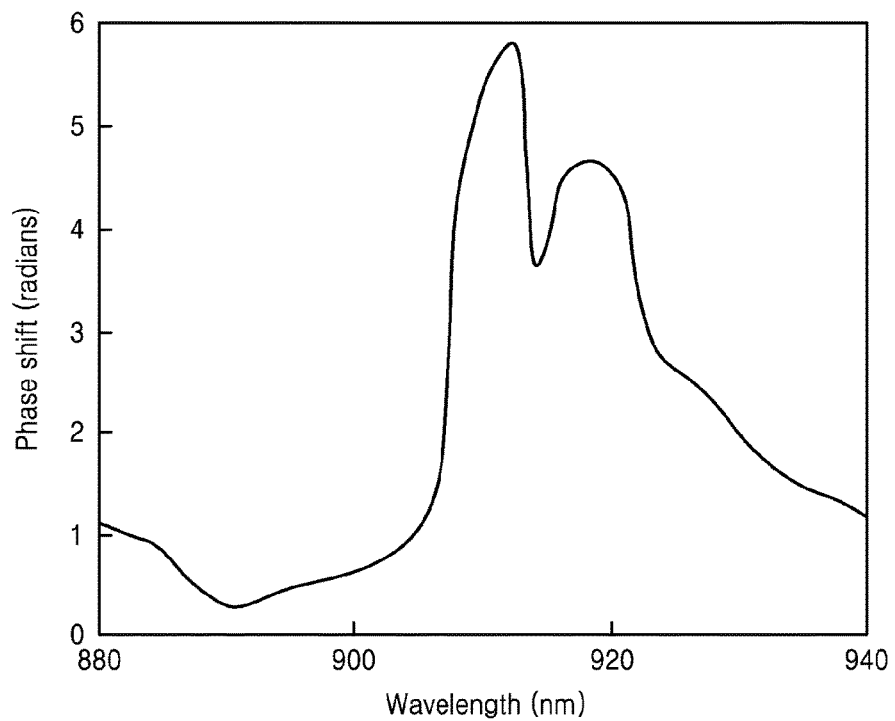
FIGS. 5A and 5B are graphs showing a phase shift and a reflectance according to a wavelength of phase-modulated reflected light output from the optical modulating device according to an example embodiment.
Figure 5B:
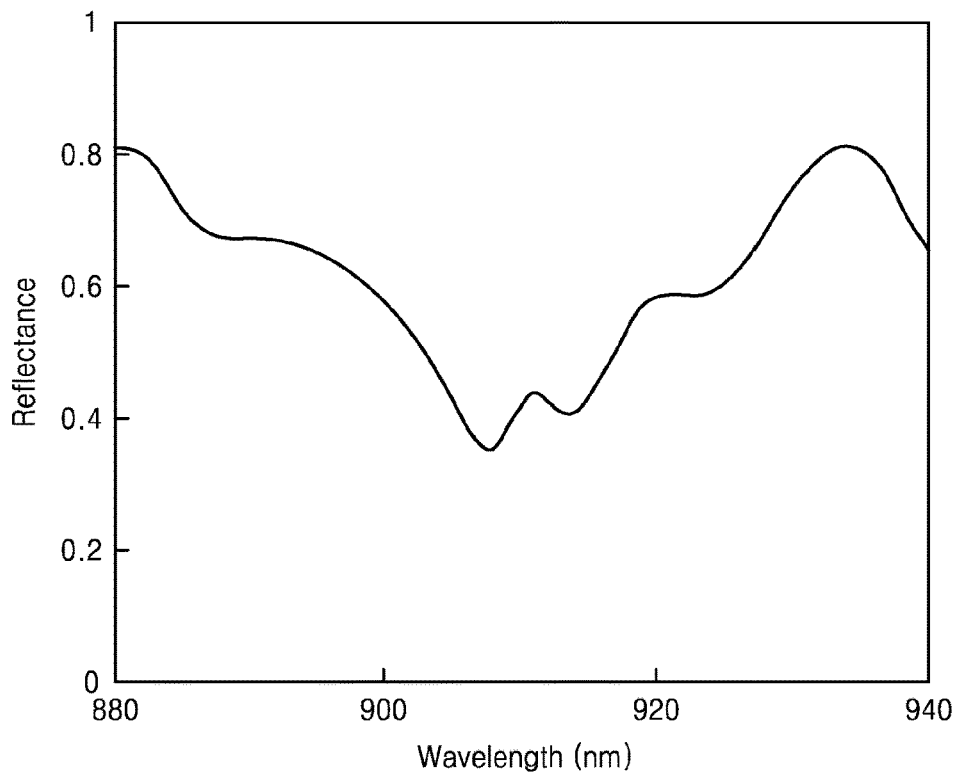

As illustrated in FIG. 4, when a pattern height h, a pattern width w, and a pattern pitch p of the dielectric nanoantenna 70 are about 120 nm, about 120 nm, and about 320 nm, respectively, and a thickness t of the quantum well layer 40 is about 150 nm, a phase shift and a reflectance of the optical modulating device 10 according to an example embodiment may exhibit characteristics as shown in FIGS. 5A and 5B. FIGS. 5A and 5B are graphs showing a phase shift and a reflectance according to a wavelength of phase-modulated reflected light output from the optical modulating device 10 according to an example embodiment.

Referring to FIGS. 5A and 5B, according to the optical modulating device 10 according to an example embodiment, a phase is modulated by a voltage applied to the quantum well layer 40 near about 912 nm of a resonance wavelength such that the phase is changed by about 330°, and a reflectance in this case is about 0.4 that exhibits a higher-efficiency level. In addition, the optical modulating device 10 according to an example embodiment may exhibit a larger phase shift and reflectance in a wider band range. The optical modulating device 10 according to an example embodiment is a reflective meta device and may implement a higher-efficiency higher-phase optical modulating device.

In the optical modulating device 10 according to an example embodiment, a pattern height, a pattern width, a pattern pitch of the dielectric nanoantenna 70, a thickness of the quantum well layer 40, and a phase shift and a reflectance of the optical modulating device 10 are not limited to FIGS. 4, 5A, and 5B, and may be variously modified.

Although an example embodiment in which the phase modulator 100 of the optical modulating device 10 is configured in a stack structure of the quantum well layer 40 and the dielectric nanoantenna 70 has been described as an example, the example embodiments are not limited thereto. For example, the phase modulator 100 may be formed by patterning the quantum well layer 40 to form a meta surface including a nanoantenna. In this case, as illustrated in an example embodiment of FIG. 6, the patterned quantum well layer 40 may function as a tunable dielectric nanoantenna 70.

Figure 6:
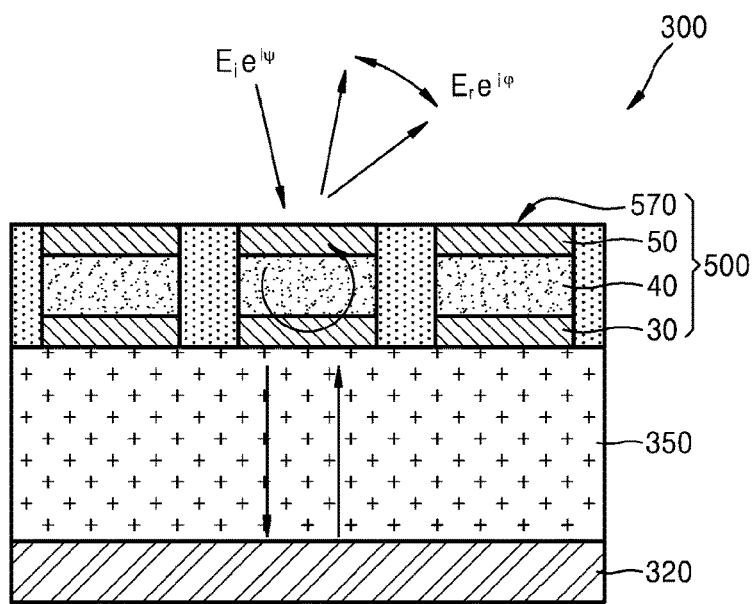
FIG. 6 schematically shows an example structure of an optical modulating device according to an example embodiment.

FIG. 6 schematically shows an example structure of an optical modulating device 300 according to an example embodiment. Herein, the same reference numerals as in FIG. 1 denote the same or similar members. In FIG. 6, the lower electrode 30, the quantum well layer 40, and the upper electrode 50 are declared with the same reference numerals as in FIG. 1, and a repeated description is omitted if possible.

Compared with FIG. 1, the optical modulating device 300 of FIG. 6 differs from the optical modulating device 10 of FIG. 1 in that the optical modulating device 10 of FIG. 1 has stack structure of the quantum well layer 40 and the dielectric nanoantenna 70, whereas the quantum well layer 40 in the optical modulating device 300 of FIG. 6 is patterned so as to form a meta surface including a nanoantenna.

Referring to FIG. 6, the optical modulating device 300, as a reflective meta device, includes a phase modulator 500 including the quantum well layer 40 and having a meta surface including a nanoantenna 570, and a reflective layer 320 provided at an opposite surface of the phase modulator 500 from the meta surface of the phase modulator 500. That is, the optical modulating device 300 may be formed in a structure including the reflective layer 320 and the phase modulator 500, including the quantum well layer 40 and the meta surface including the nanoantenna 570, provided on the reflective layer 320.

The phase modulator 500 may include the meta surface including the nanoantenna 570 configured to couple incident light and may be provided to modulate a phase of light by modulating a refractive index according to an electrical control of the quantum well layer 40. In the phase modulator 500, the quantum well layer 40 includes an MQW to modulate a refractive index by using the electro-optic effect of the MQW. Herein, the quantum well layer 40 may be a quantum well layer of, for example, a pin structure, including an MQW.

In the example embodiment, the nanoantenna 570 may be formed by patterning the quantum well layer 40 in a nanostructure. According to this patterning, the quantum well layer 40 including the nanoantenna 570 may have an arrangement of a plurality of quantum well layer regions being spaced apart from each other. In this case, between the quantum well layer regions patterned in a nanostructure, there may be a space, or an insulating material or the like may be filled. FIG. 6 illustrates an example embodiment in which an insulating material is filled between the quantum well layer regions.

The optical modulating device 300 according to the example embodiment may further include a spacer layer 350, e.g., a dielectric spacer layer, between the quantum well layer 40 and the reflective layer 320. The spacer layer 350 may be formed of a dielectric material.

In the optical modulating device 300, the quantum well layer 40 having a meta surface including the nanoantenna 570 may directly function as a tunable dielectric nanoantenna.

The nanoantenna 570 which is formed by patterning the quantum well layer 40 in a nanostructure to form a meta surface may exhibit a higher antenna efficiency by using Mie resonance by a displacement current. To this end, the quantum well layer 40 may be patterned such that the nanoantenna 570 has a shape defined by a dimension of a sub-wavelength order, which is less than a wavelength of light to be modulated by the phase modulator 500. At least one of the dimensions defining a shape of the nanoantenna 570 may be a dimension of the sub-wavelength. For example, when a wavelength of light to be modulated by the phase modulator 500 is $\lambda$, the sub-wavelength may have a dimension equal to or less than $\lambda/2$.

According to the optical modulating device 300 according to the example embodiment, the quantum well layer 40 may be patterned in a nanostructure to have an arrangement of a plurality of quantum well layer regions. The lower electrode 30 and the upper electrode 50 may be provided on a lower part and an upper part of each of the plurality of quantum well layer regions to modulate a refractive index by electrically controlling each quantum well layer region included in the arrangement of the plurality of quantum well layer regions.

Accordingly, the optical modulating device 300 may include an array of a plurality of phase modulators 500, each phase modulator 500 including each quantum well layer region, and the lower electrode 30 and the upper electrode 50 corresponding thereto. In this case, each phase modulator 500 of the array of the plurality of phase modulators 500 may be controlled independently, or the array of the plurality of phase modulators 500 may be controlled in a unit of two or more phase modulators 500.

Figure 7A:
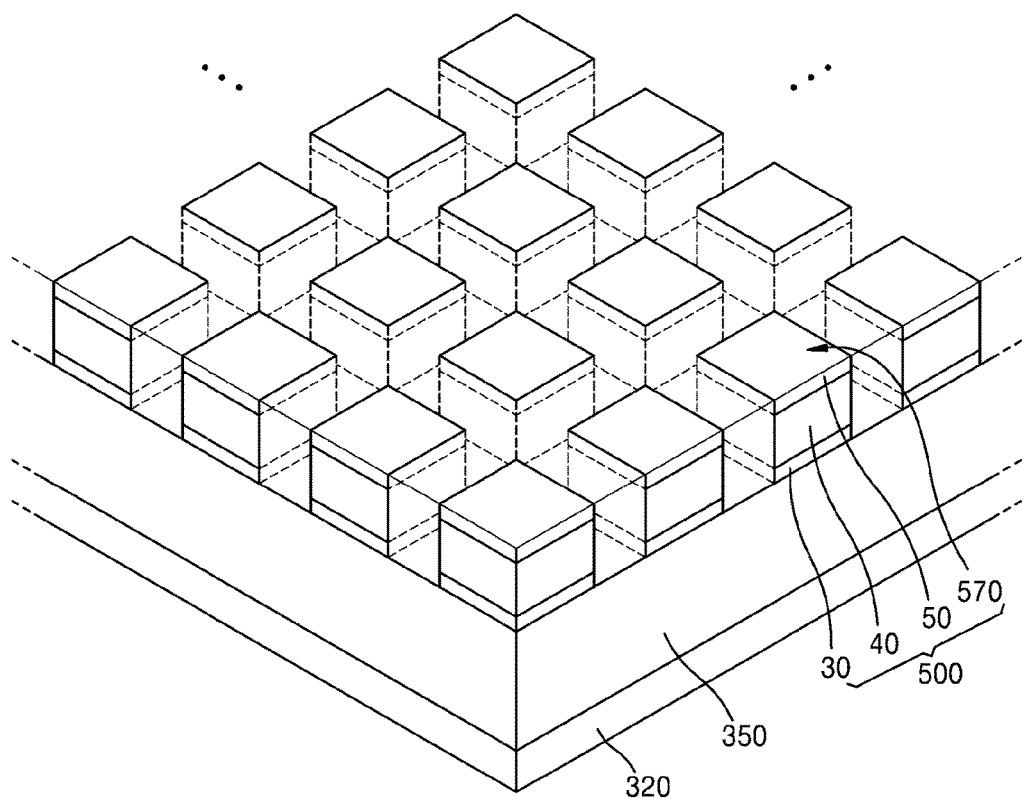
FIG. 7A shows an example in which the optical modulating device of FIG. 6 is implemented as a two-dimensional optical modulating device.

The optical modulating device 300 according to the example embodiment may have the plurality of phase modulators 500 arranged two-dimensionally as shown in FIG. 7A to form a two-dimensional optical modulating device configured to two-dimensionally modulate a phase. Herein, one phase modulator 500 or two or more phase modulators 500 may be provided to form a two-dimensional array in units of pixels such that a beam may be two-dimensionally steered by phase modulation of each phase modulator 500. In this case, an incident beam may be two-dimensionally steered by using the two-dimensional optical modulating device.

Figure 7B:
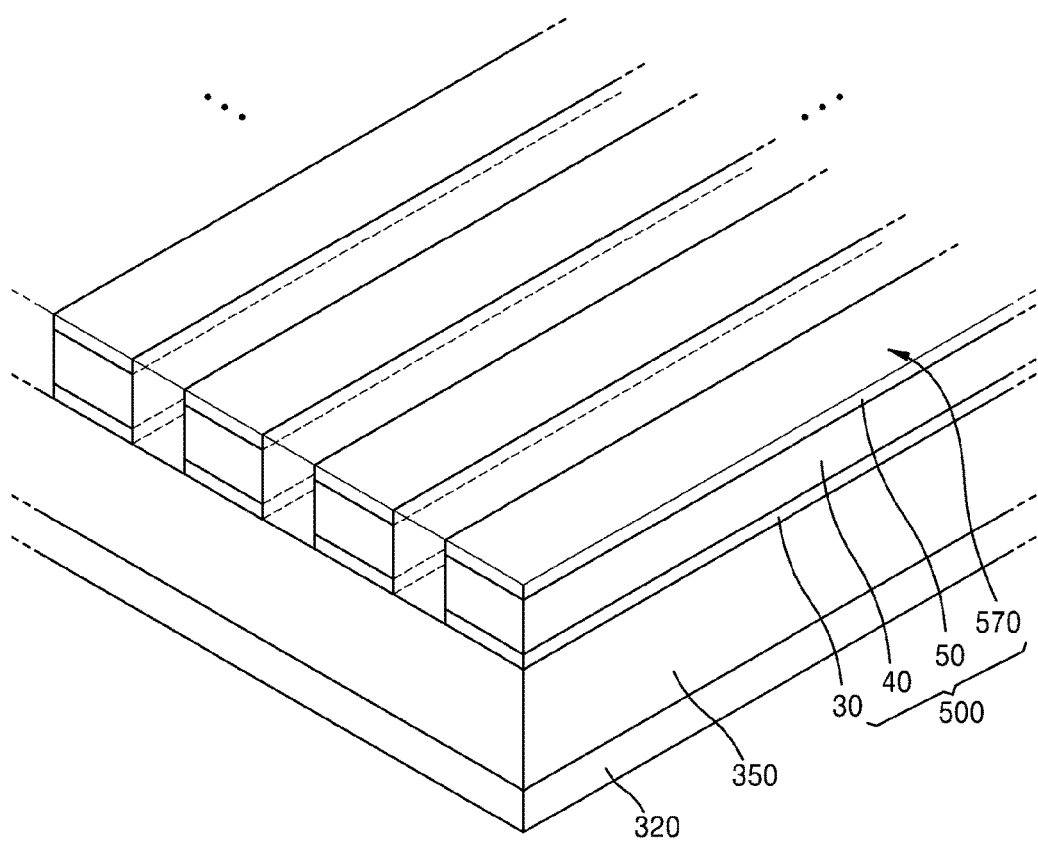
FIG. 7B shows an example in which the optical modulating device of FIG. 6 is implemented as a one-dimensional optical modulating device.

According to another example embodiment, the plurality of phase modulators 500 may be arranged one-dimensionally as shown in FIG. 7B to form a one-dimensional optical modulating device. Herein, each phase modulator 500 may be provided in a linear shape to form a one-dimensional array such that a beam may be one-dimensionally steered by phase modulation of the phase modulator 500 in a unit of one phase modulator 500 or two or more phase modulators 500. In this case, an incident beam may be one-dimensionally steered by using the one-dimensional optical modulating device.

In the example embodiment, the reflective layer 320 may be formed as a reflector of a general metal material and may function as a common ground. However, example embodiments are not limited thereto, and the reflective layer 320 may include a DBR.

In the optical modulating device 300 according to the example embodiment, the nanoantenna 570 located on the spacer layer 350 and the reflective layer 320 located at a lower part of the optical modulating device 300 may function as a Mie resonator interacting with Fabry-Perot resonance to shift a phase of a reflected beam by up to about 2 pi.

In this case, dimensions and a geometric structure of the nanoantenna 570 and a thickness of the spacer layer 350 may be determined to tune the nanoantenna 570 and a Fabry-Perot resonant frequency.

As described above, the optical modulating device 300 according to an example embodiment may have a structure in which the reflective layer 320 is located at a lower part thereof, and the quantum well layer 40 is formed on the reflective layer 320, where the quantum well layer 40 is patterned to have a meta surface including the nanoantenna 570.

According to this example optical modulating device 300, the nanoantenna 570 may be configured to couple incident light, and a refractive index of the quantum well layer 40 through which light passes in a resonance operation with the reflective layer 320 located at a lower part, may be modulated, such that a phase of resonated light may be modulated. Herein, the refractive index of the quantum well layer 40 may be modulated by a voltage applied through the upper electrode 50 and the lower electrode 30, and a phase of light may be modulated according to this refractive index modulation.

In addition, the optical modulating device 300 according to an example embodiment, may be obtained by performing epitaxy growth in the order of the upper electrode 50, the quantum well layer 40 having an MQW, and the lower electrode 30 on a substrate, e.g., a Group III-V semiconductor. Then patterning may be performed to obtain an array of a plurality of phase modulators 500 such that a nanoantenna structure forming a meta surface is formed, filling an insulating material between quantum well layer regions, then coating the spacer layer 350, e.g., a dielectric spacer layer, and the reflective layer 320 thereon, and turning it over. In this case, the substrate may be removed.

According to the example embodiment of the optical modulating device 300, the MQW of the quantum well layer 40 may directly function as a tunable dielectric antenna such that a refractive index change causes a change in a phase of reflected light.

Figure 8:
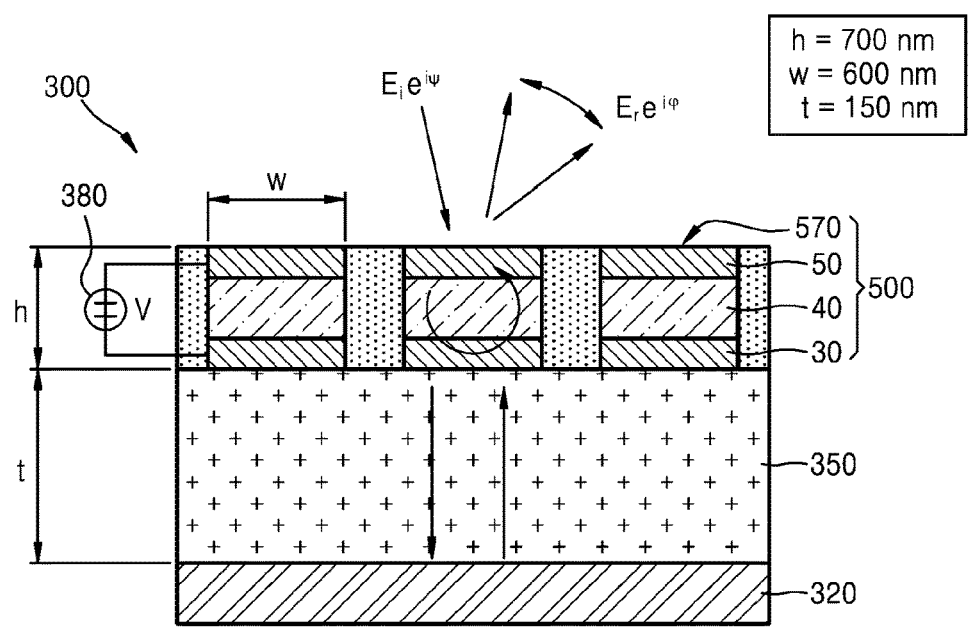
FIG. 8 illustrates an example in which the optical modulating device of FIG. 6 operates as a Mie resonator to modulate a phase of incident light according to an example embodiment.

FIG. 8 illustrates an example in which the optical modulating device 300 of FIG. 6 operates as a Mie resonator to modulate a phase of incident light.

Referring to FIG. 8, when light is incident to the nanoantenna 570 of the optical modulating device 300, incident light $E_i e^{i\psi}$ is coupled by the nanoantenna 570 and travels through the quantum well layer 40. The nanoantenna 570 may be made of, for example, a Group III-V semiconductor material having a higher refractive index, and thus the nanoantenna 570 may function as a Mie resonator interacting with Fabry-Perot resonance. Fabry-Perot resonance may occur between the reflective layer 320 and the lower electrode 30 at both sides of the spacer layer 350. A phase of resonated light may be modulated by applying a voltage from a driver 380 to the upper and lower electrodes 50 and 30 to modulate of a refractive index of the MQW of the quantum well layer 40, and accordingly, phase-modulated reflected light $E_r e^{i\Phi}$ may be output from the optical modulating device 300.

Dimensions and a geometric structure of the nanoantenna 570 and a thickness of the dielectric spacer layer 350 may be determined to tune a resonant frequency of the nanoantenna 570 and a Fabry-Perot resonant frequency.

In the optical modulating device 300 according to an example embodiment as illustrated in FIG. 8, a pattern height of the nanoantenna 570 may correspond to a sum of thicknesses of the lower electrode 30, the quantum well layer 40, and the upper electrode 50. In addition, compared with the optical modulating device 10 of FIG. 1, in the optical modulating device 300 according to an example embodiment as shown in FIG., a pattern height and a pattern width of the nanoantenna 570 may have larger values. The thickness of the spacer layer 350 may be similar to the thickness of the quantum well layer 40 in the example embodiment as illustrated in FIG. 1.

Figure 9A:
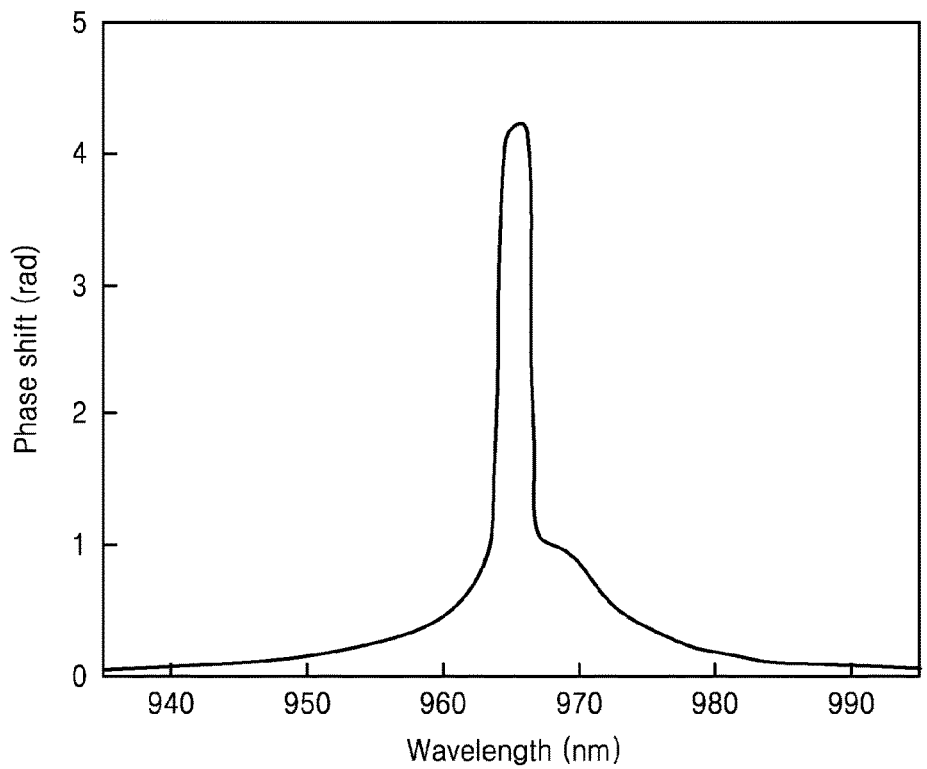
FIGS. 9A and 9B are graphs showing a phase shift and a reflectance according to a wavelength of phase-modulated reflected light output from the optical modulating device according to an example embodiment.
Figure 9B:
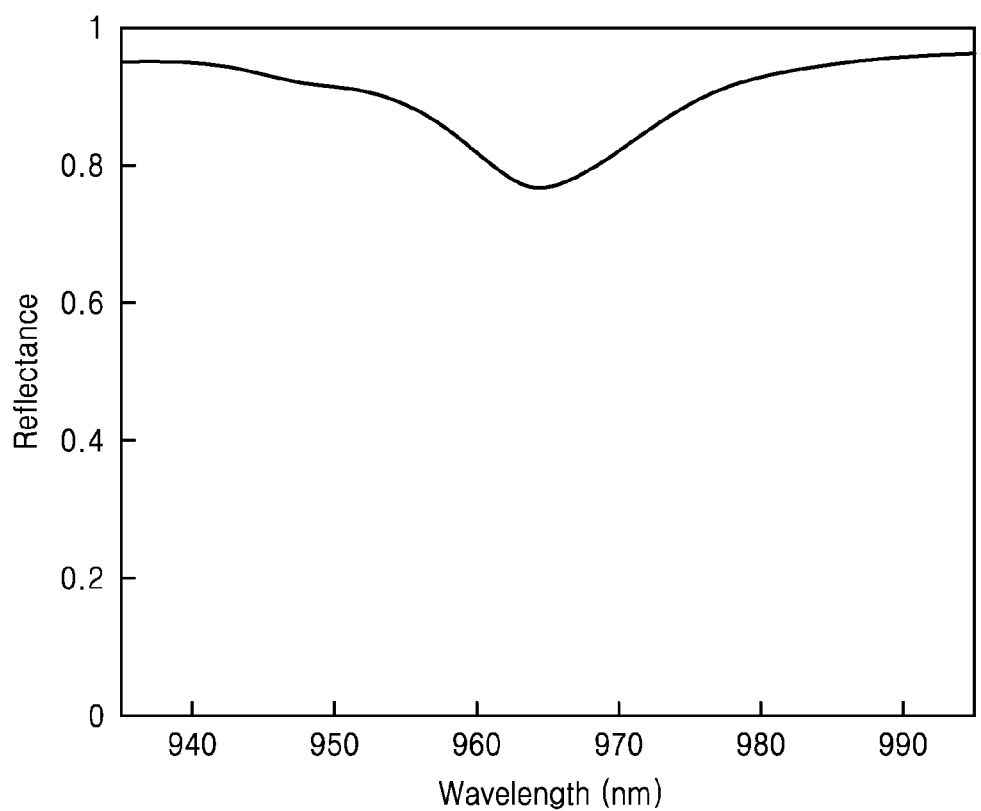

As illustrated in FIG. 8, when a pattern height h and a pattern width w of the nanoantenna 570 are about 700 nm and about 600 nm, respectively, and a thickness t of the spacer layer 350 is about 150 nm, a phase shift and a reflectance of the optical modulating device 300 according to the example embodiment may exhibit characteristics as shown in FIGS. 9A and 9B. FIGS. 9A and 9B are graphs showing a phase shift and a reflectance according to a wavelength of phase-modulated reflected light output from the optical modulating device 300 according to the example embodiment.

Referring to FIGS. 9A and 9B, according to the optical modulating device 300 according to the example embodiment, a phase may be modulated by a voltage applied to the quantum well layer 40 near about 965 nm of a resonance wavelength such that the phase is changed by about 246°, and a reflectance in this case is about 0.8 that exhibits a higher-efficiency level. FIGS. 9A and 9B show that a larger phase shift value and a higher reflectance at a higher efficiency are exhibited with respect to a refractive index change (Δn) of about 0.005. In addition, as shown in FIG. 9A, the optical modulating device 300 according to the example embodiment may have a wavelength selection characteristic since a larger phase shift may dominantly occur in a resonant wavelength band.

Therefore, according to the optical modulating device 300 according to the example embodiment, a higher-efficiency higher-phase optical modulating device as a reflective meta device, may be implemented.

The pattern height and the pattern width of the nanoantenna 570 and the thickness of the spacer layer 350 in the optical modulating device 300 according to the example embodiment and the phase shift and the reflectance of the optical modulating device 300 are not limited to FIGS. 8, 9A, and 9B, and may be variously modified.

Figure 10:
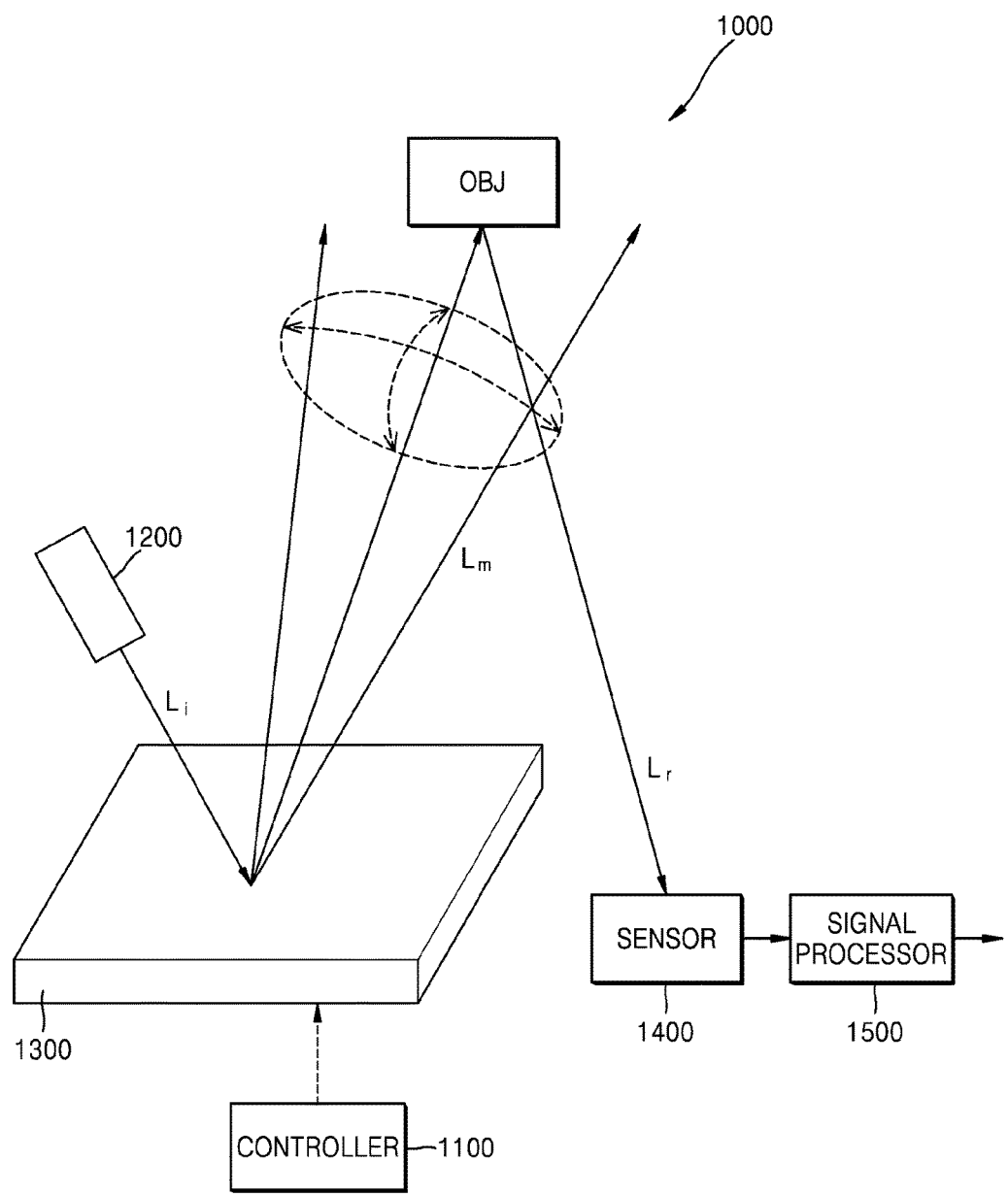
FIG. 10 is a block diagram of a schematic configuration of a light detecting and ranging (LIDAR) system.

FIG. 10 is a block diagram of a schematic configuration of a LIDAR system 1000.

Referring FIG. 10, the LIDAR system 1000 may include a light source unit 1200 configured to emit light, a beam steering apparatus 1300 configured to steer the light emitted from the light source unit 1200 to be oriented to an object OBJ, and a sensor 1400 configured to sense light reflected from the object OBJ.

In addition, the LIDAR system 1000 may further include a controller 1100 configured to adjust a phase profile in the beam steering apparatus 1300, and a signal processor 1500 configured to process a signal sensed by the sensor 1400. According to an example embodiment, the controller 1100 may be implemented as a processor or may include at least one processor.

The light source 1200 may emit light to be used to analyze a position and a shape of the object OBJ. The light source unit 1200 may include a light source configured to generate and emit light of a certain wavelength. The light source unit 1200 may include a light source such as, for example, a laser diode (LD), a light emitting diode (LED), or a super luminescent diode (SLD) configured to generate and emit light of a wavelength band suitable for shape analysis, for example, light of an infrared wavelength band. The light source unit 1200 may generate and emit a plurality of lights of different wavelength bands. The light source unit 1200 may generate and emit pulsed light or continuous light.

The beam steering apparatus 1300 may include an optical modulating device configured to steer an incident beam of the incident light $L_i$ by independently modulating a phase of incident light $L_i$ from the light source unit 1200 such that a beam of the incident light $L_i$ is steered one-dimensionally or two-dimensionally. The beam steering apparatus 1300 may include the optical modulating device 10 or 300 described with reference to FIGS. 1 through 9B or an optical modulating device modified therefrom.

Between the light source unit 1200 and the beam steering apparatus 1300 or between the beam steering apparatus 1300 and the object OBJ, other optical members, for example, members for path adjustment of light emitted from the light source unit 1200, wavelength split, or additional modulation, may be further arranged.

The controller 1100 may control an input signal to the driver 80 or 380 of the optical modulating device 10 or 300 provided in the beam steering apparatus 1300 such that the beam steering apparatus 1300 has a phase profile for a beam steering function. The controller 1100 may also control the beam steering apparatus 1300 to scan the object OBJ by sequentially adjusting a steering direction of the beam steering apparatus 1300. The beam steering apparatus 1300 enables a beam to be steered in a one-dimensional or two-dimensional direction, and accordingly, the object OBJ may be scanned along the one-dimensional or two-dimensional direction. The incident light $L_i$ provided from the light source unit 1200 may be modulated and reflected by the beam steering apparatus 1300 to modulated light $L_m$. While the light $L_m$ is scanning the object OBJ along the two-dimensional direction, reflected light $L_r$ reflected from the object OBJ may be sensed by the sensor 1400. A sensed optical signal is delivered to the signal processor 1500, and may be used to analyze the presence, a position, a shape, and the like of the object OBJ.

The sensor 1400 may include an array of a plurality of sensors for light detection, which may sense light reflected from the object OBJ. The sensor 1400 may include an array of sensors capable of sensing a plurality of lights of different wavelengths.

The signal processor 1500 may perform certain computation, e.g., computation for time of flight measurement, from an optical signal detected by the sensor 1400 and may determine a three-dimensional shape of the object OBJ from the computation. The signal processor 1500 may use various computation methods. For example, a direct time measurement method obtains a distance by projecting pulsed light to the object OBJ and measuring a return time of light reflected from the object OBJ by using a timer. A correlation method measures a distance by projecting pulsed light to the object OBJ and measuring brightness of reflected light returning after being reflected from the object OBJ. A phase delay measurement method is a method of projecting continuous wave light such as a sine wave to the object OBJ, detecting a phase difference of reflected light returning after being reflected from the object OBJ, and converting the detected phase difference into a distance. The signal processor 1500 may include a memory configured to store a programs and other data required for such a computation.

The signal processor 1500 may transmit a computation result, i.e., information about a shape and a position of the object OBJ to another unit. For example, the signal processor 1500 may transmit the information to a driving controller, an alarming system, or the like of an autonomous driving device employing the LIDAR system 1000.

The LIDAR system 1000 may be used as a sensor configured to acquire real-time three-dimensional information of an object in the forward direction, and thus the LIDAR system 1000 may be applied to autonomous driving devices, for example, a driverless car, an autonomous driving car, a robot, and a drone. The LIDAR system 1000 may also be applied to, for example, a black box or the like to determine obstacles in the forward and backward directions at night when it is difficult to identify an object with an image sensor only.

According to an optical modulating device and a system employing the same according to an example embodiment, a phase modulator, which includes a meta surface having a nanoantenna configured to couple incident light and a quantum well layer having a multi-quantum well, and a reflective layer are provided, and a phase of incident light is modulated by modulating a refractive index using the electro-optic effect of the multi-quantum well, and thus a higher-efficiency higher-phase optical modulating device, as a reflective meta device, may be implemented.

While the optical modulating devices 10 and 300 described above have been described with reference to the example embodiments shown in the drawings, it will be understood by those skilled in the art that these are only illustrative, and various modifications and other equivalent embodiments may be made therefrom. Therefore, the example embodiments should be considered in a descriptive sense only and not for purposes of limitation. The scope of the present disclosure is defined not by the detailed description but by the appended claims, and their equivalents.

What is claimed is:

1. An optical modulating device comprising:
   a phase modulator comprising:
      a meta surface comprising a dielectric nanoantenna configured to couple light incident on the phase modulator, and
      a quantum well layer comprising a multi-quantum well configured to modulate a phase of the light incident by modulating a refractive index of the quantum well layer by an electrical control; and
   a reflective layer provided on the phase modulator opposite to a side of the meta surface of the phase modulator and configured to resonate the light coupled by the nanoantenna,
   wherein the phase modulator further comprises a lower electrode and an upper electrode respectively provided on a lower part and an upper part, opposite to the lower part, of the quantum well layer, and configured to modulate a refractive index of the quantum well layer by electrically controlling the quantum well layer.

2. The optical modulating device of claim 1,
   wherein the dielectric nanoantenna is formed by patterning a dielectric layer in a nanostructure to form the meta surface comprising the nanoantenna.

3. The optical modulating device of claim 1, wherein the phase modulator is provided on the reflective layer, the lower electrode is provided on the reflective layer, the quantum well layer is provided on the lower electrode, the upper electrode is provided on the quantum well layer, and a plurality of dielectric nanoantennas are provided on the upper electrode.

4. The optical modulating device of claim 3, wherein a plurality of quantum well layer regions comprising the quantum well layer are provided on the lower electrode and spaced apart from each other,
   the upper electrode is provided on each quantum well layer region, and
   the plurality of dielectric nanoantennas are arranged on each upper electrode formed on each quantum well layer region,
   wherein the phase modulator comprises an array of a plurality of phase modulators, and is configured to independently control each of the plurality of phase modulators.

5. The optical modulating device of claim 4, wherein the lower electrode is a common electrode.

6. The optical modulating device of claim 4, wherein the plurality of phase modulators are arranged two-dimensionally to form a two-dimensional optical modulating device.

7. The optical modulating device of claim 4, wherein the plurality of phase modulators are arranged one-dimensionally to form a one-dimensional optical modulating device.

8. The optical modulating device of claim 1, wherein the reflective layer comprises a distributed Bragg reflector.

9. The optical modulating device of claim 1, wherein the quantum well layer is configured to form a multi-quantum well by using a Group III-V semiconductor.

10. A light detecting and ranging (LIDAR) apparatus comprising:
    a light source configured to emit light;
    the optical modulating device in claim 1 configured to steer light emitted from the light source toward an object; and
    a sensor configured to receive light steered by the optical modulating device toward the object and reflected from the object.

11. An optical modulating device comprising:
    a phase modulator comprising:
       a meta surface comprising a nanoantenna configured to couple light incident on the phase modulator, and
       a quantum well layer comprising a multi-quantum well configured to modulate a phase of the light incident by modulating a refractive index of the quantum well layer by an electrical control; and
    a reflective layer provided on the phase modulator opposite to a side of the meta surface of the phase modulator and configured to resonate the light coupled by the nanoantenna,
    wherein the nanoantenna of the phase modulator is formed by patterning the quantum well layer in a nanostructure,
    wherein the quantum well layer comprises a plurality of quantum well layer regions,
    wherein each of the plurality of quantum well layer regions forming the nanoantenna is spaced apart from one another, and
    wherein the optical modulating device further comprises a lower electrode and an upper electrode on a lower part and an upper part, opposite to the lower part, of each of the plurality of quantum well layer regions, respectively, and is configured to modulate a refractive index by electrically controlling the quantum well layer.

12. The optical modulating device of claim 11, further comprising a spacer layer between the quantum well layer and the reflective layer.

13. The optical modulating device of claim 12, wherein the spacer layer is formed of a dielectric material.

14. The optical modulating device of claim 11, wherein the reflective layer is a common electrode.

15. The optical modulating device of claim 11, wherein the phase modulator comprises an array of a plurality of phase modulators, each of the plurality of phase modulators comprising each of the plurality of quantum well layer regions, and the lower electrode and the upper electrode corresponding to each of the plurality of quantum well layer regions.

16. The optical modulating device of claim 15, wherein the phase modulators in the array of the plurality of phase modulators are configured to be independently controlled.

17. The optical modulating device of claim 15, wherein the array of the plurality of phase modulators is arranged two-dimensionally to form a two-dimensional optical modulating device.

18. The optical modulating device of claim 15, wherein the array of the plurality of phase modulators is arranged one-dimensionally to form a one-dimensional optical modulating device.

* * * * *